United States Patent [19]

Stewart et al.

[11] Patent Number: 5,761,634
[45] Date of Patent: Jun. 2, 1998

[54] METHOD AND APPARATUS FOR GROUP ENCODING SIGNALS

[75] Inventors: Kenneth A. Stewart, Palatine; Michael D. Kotzin, Buffalo Grove, both of Ill.

[73] Assignee: Motorola, Inc., Schaumburg, Ill.

[21] Appl. No.: 627,872

[22] Filed: Apr. 4, 1996

Related U.S. Application Data

[63] Continuation of Ser. No. 198,750, Feb. 17, 1994, abandoned.

[51] Int. Cl.[6] .......................................................... G01L 5/00
[52] U.S. Cl. .......................... 704/220; 704/243; 704/211; 704/229; 704/230
[58] Field of Search .......................... 395/22.21, 2.29, 395/2.59, 28, 32, 34, 38–39

[56] References Cited

U.S. PATENT DOCUMENTS

| | | | |
|---|---|---|---|
| 4,455,649 | 6/1984 | Esteban et al. | 395/2.38 |
| 4,535,472 | 8/1985 | Tomcik | 395/2.38 |
| 4,896,362 | 1/1990 | Veldhuis et al. | 395/2.38 |
| 4,949,383 | 8/1990 | Koh et al. | 395/2.38 |
| 4,956,871 | 9/1990 | Swaminathan | 395/2.37 |
| 5,150,387 | 9/1992 | Yoshikawa et al. | 395/2.38 |
| 5,159,447 | 10/1992 | Haskell et al. | 348/419 |
| 5,204,876 | 4/1993 | Bruckert et al. | 375/1 |
| 5,301,255 | 4/1994 | Nagai et al. | 395/2.39 |
| 5,341,457 | 8/1994 | Hall, II et al. | 395/2.31 |
| 5,349,645 | 9/1994 | Zhao | 395/2.52 |
| 5,367,608 | 11/1994 | Veldhuis et al. | 395/2.38 |
| 5,383,219 | 1/1995 | Wheatley, III et al. | 375/1 |
| 5,416,797 | 5/1995 | Gilhousen et al. | 375/705 |
| 5,535,239 | 7/1996 | Padovani et al. | 375/205 |

*Primary Examiner*—Allen R. MacDonald
*Assistant Examiner*—Vijay B. Chawan
*Attorney, Agent, or Firm*—Richard A. Sonnentag

[57] ABSTRACT

A code division multiple access (CDMA) communication system reduces system self-interference and enhances system capacity by making rate selection decisions for individual speech encoders in concert with other speech encoders. The system utilizes perpetually weighted error metrics (401) as input into a rate controller (404) which determines and provides selected rates (402) back to the encoders (105). The system provides optimum voice quality and system capacity in that it allows specific encoders to decrease their rate, which improves capacity, as necessary while allowing other encoders to maintain their rates. This prevents needless degradation in voice quality at those times when system capacity needs to be temporarily increased.

27 Claims, 5 Drawing Sheets

METHOD AND APPARATUS FOR GROUP ENCODING SIGNALS

This is a continuation of application Ser. No. 08/198,750, filed Feb. 17, 1994 and now abandoned.

FIELD OF THE INVENTION

The present invention relates to communication systems utilizing code division multiple access (CDMA) techniques and more specifically to variable rate speech encoding methods for reduction of system self-interference and enhancement of system capacity in point-multipoint multiple-access links with colocated digital speech encoding in such communication systems.

BACKGROUND OF THE INVENTION

In recent years a variety of techniques have been used to provide multi-user mobile communications within a limited available radio-frequency spectrum. These methods have included frequency division multiple access (FDMA), time division multiple access (TDMA), and code division multiple access (CDMA) or, more usually, hybrids of these methods. All of these methods have been employed within the past decade in the design of commercial cellular telecommunications systems: witness the use of FDMA in the North American AMPS system, FD/TDMA in the European Groupe Speciale Mobile (GSM) standard, and—more recently—the adoption of a direct sequence FD/CDMA approach by the United States Telecommunications Industry Association as embodied in its IS-95 standard. In the IS-95 standard, subscribers share one of several wideband radio channels in the cellular band. Several proposals for so-called personal communications systems (PCS) are also being designed on similar FD/CDMA principles.

Almost all recent cellular and PCS systems have used digital speech coding and forward channel error correction as the physical layer for voice communication. More interesting in this context, is the use of voice activity detection (VAD) to recognize the presence or absence of speech on the part of the either calling party. In the absence of speech, the speech encoder may instruct the modulator or transmitter to which it is linked to reduce its output power to zero, or transmit occasional packets of information describing only the background noise at the either user's location. Reducing the radio transmitter's duty cycle in this fashion provides the twin benefits of a reduction in power consumption (which increases battery life in the case of the mobile unit) and a reduction in interference between users sharing the same RF spectrum. Depending on the circumstances of the conversation, a reduction in transmitted power of between 40% and 65% can be achieved. The amount of power reduction is ultimately limited by the extent to which the degraded voice quality which accompanies significant VAD techniques is considered acceptable.

The possibility of power reduction is particularly important for CDMA systems. In such systems, user capacity is inversely proportional to the amount of system self-interference. In the TIA IS-95 FD/CDMA standard, the approach is slightly broadened by the use of a variable rate speech encoder in place of simple on-off or discontinuous transmission methods. In the IS-95 standard, the encoded speech is separated into 20 ms intervals which the speech encoder may elect to encode at a effective bit rate of 8000 bps, 4000 bps, 2000 bps, or 800 bps. Both the base-station to mobile station (forward) and mobile station to base-station (reverse) IS-95 links exploit variable rate encoding.

In the case of the forward link, mean transmit power is reduced by scaling down the output power as the encoded rate decreases. Channel symbol repetition allows symbol combining at the mobile receiver and hence maintenance of the energy per symbol to noise power spectral density ratio which determines link performance. It should be noted that mean transmit power—and hence system self-interference—is reduced by a factor of four during 800 bps transmission. By averaging over the aggregate voice activity for typical two-way conversations, it has been estimated that when using the standard speech encoding and voice activity detection algorithm defined in TIA standard IS-96 the mean transmit power will drop to around 41% of its nominal value. This has a significant effect on system forward link capacity.

In current implementations, however, of the IS-95 air interface standard and its associated IS-96 speech encoder standard, each forward voice link is encoded in isolation. That is, speech encoders make individual determinations of the minimum encoded rate required to maintain acceptable voice quality without regard to the other voice channels sharing the same RF spectrum. This requires that the rate-determination algorithm in each speech encoder should always minimize its encoded rate, even when the encoded rates of the other speech encoders sharing the same spectrum does not require this. For example, if all speech encoders sharing the same channel at a base-station should simultaneously seek to transmit at a low rate, the reduction in the total output power at the base-station means that each speech encoder could relax to the next higher rate at no risk to system capacity. Since minimizing the mean transmitted rate for a variable rate speech encoder requires that the voice quality be compromised, isolated speech encoding gives up voice quality needlessly. Also, as the CDMA system approaches capacity, and constraints are placed on the transmitted rate of each speech encoder in order to temporarily boost capacity, such constraints must be applied blindly, with all voice links subject to the same constraint irrespective of the effect on voice quality. This is wasteful, since it is known that voice quality depends on many different factors and so opportunities will exist for reducing the rate of specific encoders with the least overall effect on the voice quality experienced within the sector/cell.

Thus a need exists for a method and apparatus for global speech encoding on the forward link of an FD/CDMA system by making rate selection decisions for individual speech encoders in concert with all other speech encoders feeding the same sector/cell and RF channel.

DETAILED DESCRIPTION OF A PREFERRED EMBODIMENT

A code division multiple access (CDMA) communication system reduces system self-interference and enhances system capacity by making rate selection decisions for individual speech encoders in concert with other speech encoders. The system utilizes perpetually weighted error metrics (401) as input into a rate controller (404) which determines and provides selected rates (402) back to the encoders (105). The system provides optimum voice quality and system capacity in that it allows specific encoders to decrease their rate, which improves capacity, as necessary while allowing other encoders to maintain their rates. This prevents needless degradation in voice quality at those times when system capacity needs to be temporarily increased.

The preferred embodiment of the invention is described as it relates to a CDMA digital cellular communications system based on the Telecommunications Industry Association standards IS-95 and IS-96. It will be appreciated by one skilled in the art that the invention may be applied to any CDMA point-to-multipoint link (generally the forward link of a digital cellular system) in which self-interference reduction by variable rate speech encoding is to be applied. However, the technique discussed may be beneficially utilized in any communication system, and in fact is not restricted to communication systems. For example, the technique may be utilized where speech encoding occurs for storage in a memory means having limited memory space. In essence, the technique is applicable to any application where encoding (be it speech, video, data, etc.) is utilized and constraints related to the encoding (be it power level, encoding quality, system capacity, memory space, etc.) are present.

The method and apparatus group encodes signals by accepting rate determination information from at least two encoders and determining the rate of at least one encoder based on the rate determination information for the at least two encoders. In the preferred embodiment, rate determination information is quality information relating reconstruction quality as a function of encoding rate (on a 20 ms segment-by-20 ms segment basis). The quality information includes, but is not limited to, perceptual weighting error metrics generated by the analysis-by-synthesis speech encoders, signal-to-noise (S/N) ratio, segmented S/N, cepstral distance, an LPC distance measurement and a BARK spectral distance measurement, all of which are well known in the art.

The determination of the rate of the at least one encoder is based on a threshold criterion (which is typically predetermined). In the preferred embodiment, the threshold criterion may include, but is not limited to, the total output power of the sector/cell to which the encoders are assigned, the total output power of an adjacent sector/cell, the current power level of transmission by a serving base-station, the current data rate of the at least two encoders, the memory available in a memory means, the processing power available in a processing means and the bandwidth available in a predetermined spectrum. Also in the preferred embodiment, the encoders are variable rate analysis-by-synthesis encoders. These encoders may encode signals including, but not limited to, speech signals, video signals and data signals.

Figure 1:
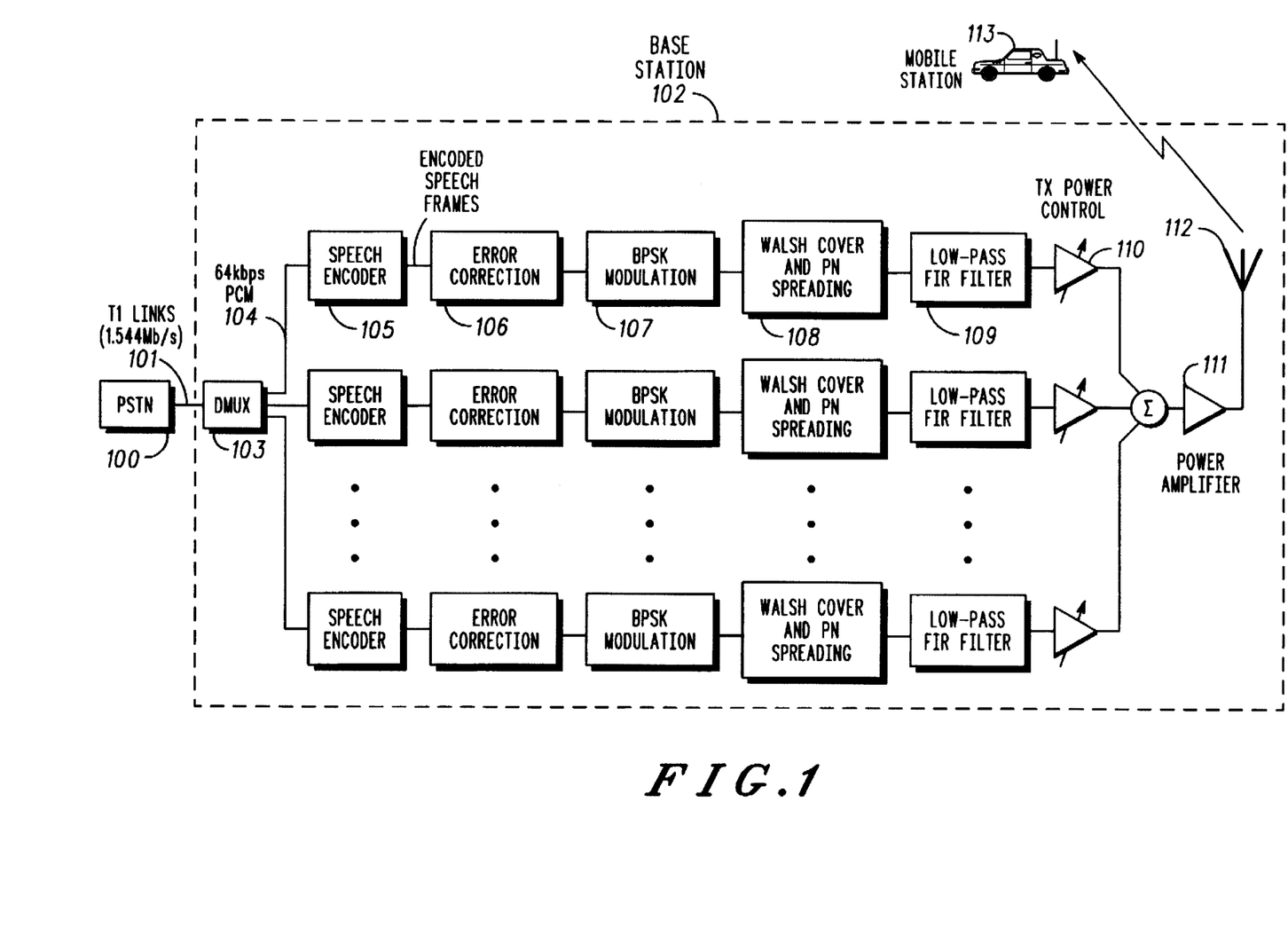
FIG. 1 generally depicts, in block diagram form, a prior art CDMA base-station transmitter.

FIG. 1 shows the high-level architecture of the forward link of a CDMA base-station (102) designed for the preferred embodiment of the TIA IS-95 digital cellular radio standard. The base-station (102) of FIG. 1 performs, inter alia, variable rate speech encoding, forward error correction, forward link power control, multiple access spreading, and modulation and transmission. In FIG. 1, several standard μ-law encoded, multiplexed, 64 kbps pulse code modulated (PCM) T1 links (101) from the public switched telephone network (PSTN) (100) are brought to a demultiplexer (103). Each 64 kbps voice link (104) is then passed through a digital speech encoder (105). In a conventional implementation, the speech encoding function is performed by a number of general purpose digital signal processors (DSP's) such as the Motorola DSP56156 processor, ROM coded DSP's, or application specific integrated circuits (ASICs). Several such processors are generally grouped onto a single printed circuit board (although this is not necessary for the invention) which is then capable of processing a full T1 trunk of multiplexed voice channels. After speech encoding, error correction (106) is applied in the form of convolutional and cyclic codes, followed by BPSK baseband modulation (107), Walsh cover and short pseudo-noise (PN) sequence spreading (108), low-pass filtering (109), transmit power level adjustment (110) and power amplification (111), and finally transmission to the mobile station (113) (for simplicity, frequency shifting to RF is not shown).

Figure 2:
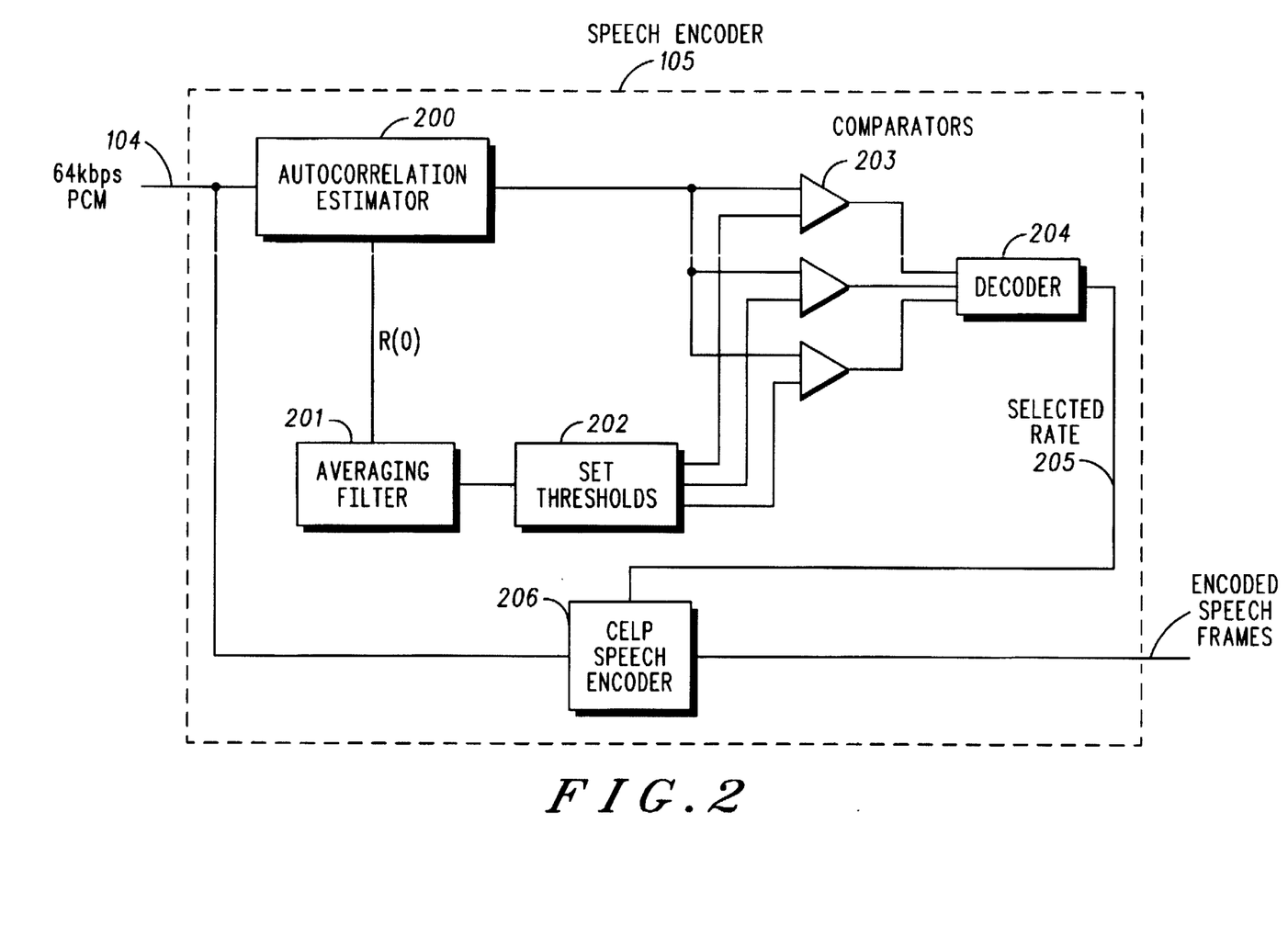
FIG. 2 generally depicts, in block diagram form, the prior art rate determination apparatus specified in speech encoding standard TIA IS-96.

A block diagram of the TIA IS-96 standard processing performed by the DSP or other device used to implement the speech encoder (105) is shown in FIG. 2. As shown, speech encoder (105) can be broken down into two main elements: rate determination and encoding. Consider first the rate determination function. In the IS-96 standard, each speech encoder (105) divides its associated PCM signal stream into contiguous 20 ms frames consisting of 160 samples of the source speech waveform. The power level of each frame (which is the zeroth lag R(0) of the autocorrelation function estimate of the frame produced by the autocorrelation estimator (200)) is fed to a bank of comparators (203) which establish which of three monotonic-increasing threshold levels the frame power exceeds. These levels are generated by 2nd order interpolation of a non-linear average of the power level of the speech signal formed by block (201). Note that all these processing steps are completely defined in TIA standard IS-96. If the current frame energy is less than the lowest of the three thresholds, the frame is declared an ⅛ rate frame; if the frame energy lies between the lowest and middle of the thresholds, the frame is declared a ¼ rate frame; if it is between the middle and highest threshold, the frame is the declared a ½ rate frame; and finally, if the frame energy exceeds the highest threshold level, the frame is declared a full rate frame. This final step is performed by comparators (203) and decoder (204) to produce the selected rate (205).

The selected rate (205) is then input to the codebook excited linear predictive (CELP) speech encoding function (206) which forms a parametric description of the speech frame using the specified number of bits for that rate. In the preferred embodiment, the number of bits used to express the encoded parameters of an ⅛ rate frame is 16 (ignoring additional bits used for error correction/detection); for a ¼ rate frame, 40 bits; for a ½ rate frame, 72 bits; and for a full rate frame, 160 bits. While CELP is depicted and discussed in the preferred embodiment, other encoding techniques such as, inter alia, waveform coding, linear predictive coding (LPC), sub-band coding (SBC), code excited linear prediction (CELP), stochastically excited linear prediction (SELP), vector sum excited linear prediction (VSELP), improved multiband excitation (IMBE), and adaptive differential pulse code modulation (ADPCM) coding algorithms may likewise be beneficially employed.

Figure 3:
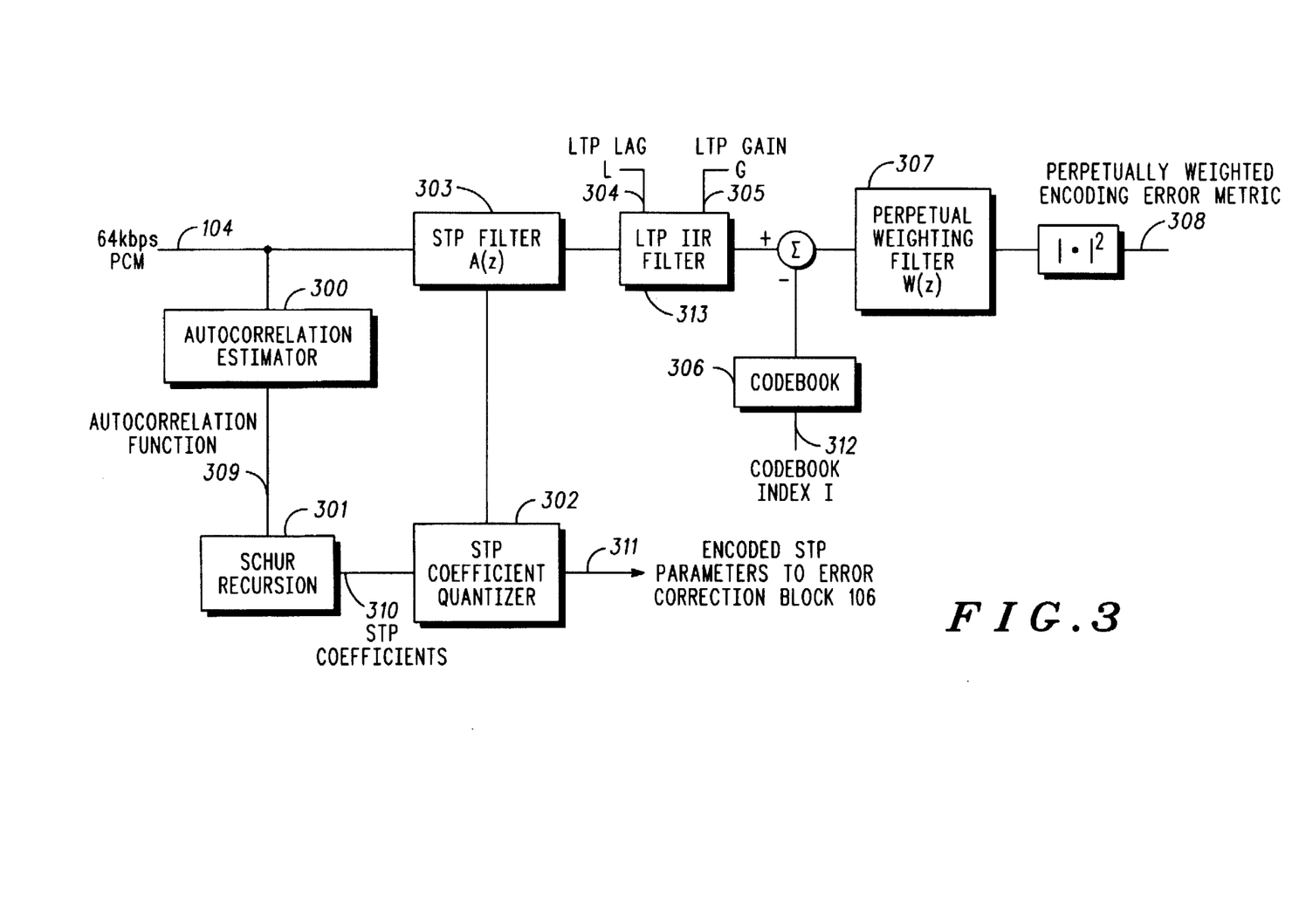
FIG. 3 generally depicts, in block diagram form, a codebook excited linear predictive speech encoder of the type utilized in the preferred embodiment and described in detail in speech encoding standard TIA IS-96.

For the purpose of clarity, it is necessary to describe in more detail the CELP speech encoding procedure. A high-level block diagram of the signal processing used in the CELP speech encoder of the preferred embodiment appears in FIG. 3. As shown in FIG. 3, an estimate (309) of the autocorrelation function of consecutive 20 ms frames of the 64 kbps speech signal (104) is first obtained (this is usually done in common with block (200) of the rate determination procedure). Next, solution of the so-called Normal Equations using, for example, the Schur Recursion (301), provides the short term linear predictive (STP) filter coefficients (310). Often, the STP filter (303) is a lattice filter, and the STP coefficients are lattice filter reflection coefficients. After quantization (302) by line spectral pairing or some other robust quantization method, the STP coefficients are used to filter the speech signal. The resulting signal is next passed to the long term prediction (LTP) filter (313) and (in the case of a CELP linear predictive coder) the codebook search procedure. The LTP filter is generally a first order recursive filter whose feedback delay and gain are variable—they appear in FIG. 3 as LTP lag L (304) and LTP gain G (305). Encoding then proceeds by simultaneously adjusting the LTP lag and gain and the codebook index 1 (312) so that the square error at the output of the LTP filter is minimized. L, G, and I are then quantized (often using simple biased linear quantizers methods), and passed along with the STP coefficients to the error correction block. The performance of this analysis-by-synthesis procedure can be improved by weighting the error metric which is to be minimized by the human auditory frequency response. This is done with a perceptual weighting filter (307) which modifies the error metric (308) to emphasize those frequency components to which the human ear is most sensitive. One skilled in the art will appreciate that the perceptually weighted error metric is made available by almost all sophisticated analysis-by-synthesis speech encoders. The present invention, as mentioned above, is therefore not limited exclusively to CELP speech encoders.

With this background, group speech encoding in accordance with the invention may now be described. It is clear from FIG. 1 and FIG. 2 that, in the prior art, the encoded rate of each forward link speech encoder is determined in isolation. That is, the encoded rate of each 64 kbps voice link is determined exclusively by signal processing that speech signal. Since the amount of self-interference (and hence the capacity) in the forward link of a CDMA system depends on the mean encoded rate of each encoder, it is also clear that in order to operate at the maximum possible capacity, the rate determination algorithm of each speech encoder must be designed to always seek the minimum possible rate, since each encoder operates in isolation and has no knowledge of the total power (and hence system self-interference) being emitted at the base-station antenna (112). Since speech quality must be sacrificed to achieve low mean encoded rates, this implies that overall system speech quality is unnecessarily sacrificed when the system is not at its maximum capacity—or equivalently, is not transmitting its maximum allotted power. Put another way, isolated speech encoding allows the total instantaneous output power at he base-station to have a large variance.

Since, in many CDMA power control algorithms, a strict limit is placed on total emitted power from a cell or sector, the rate used to encode individual links must be kept unnecessarily low. In addition, it is known that the perceptual quality of a digitally encoded voice link is dependent not only on the speech encoder being used, but also on factors such as the gender, accent, loudness of the speaker, and environmental factors such as type/levels of acoustic background noise. Thus, by encoding each link in isolation, no recognition is made of situations where one link may be reduced in rate with a smaller loss in perceived overall voice quality than an equivalent reduction in rate on another link, and hence another speaker. Further, the current art embodied in TIA standard IS-96 makes no use of the perceptually-weighted encoding error in performing rate determination.

Figure 4:
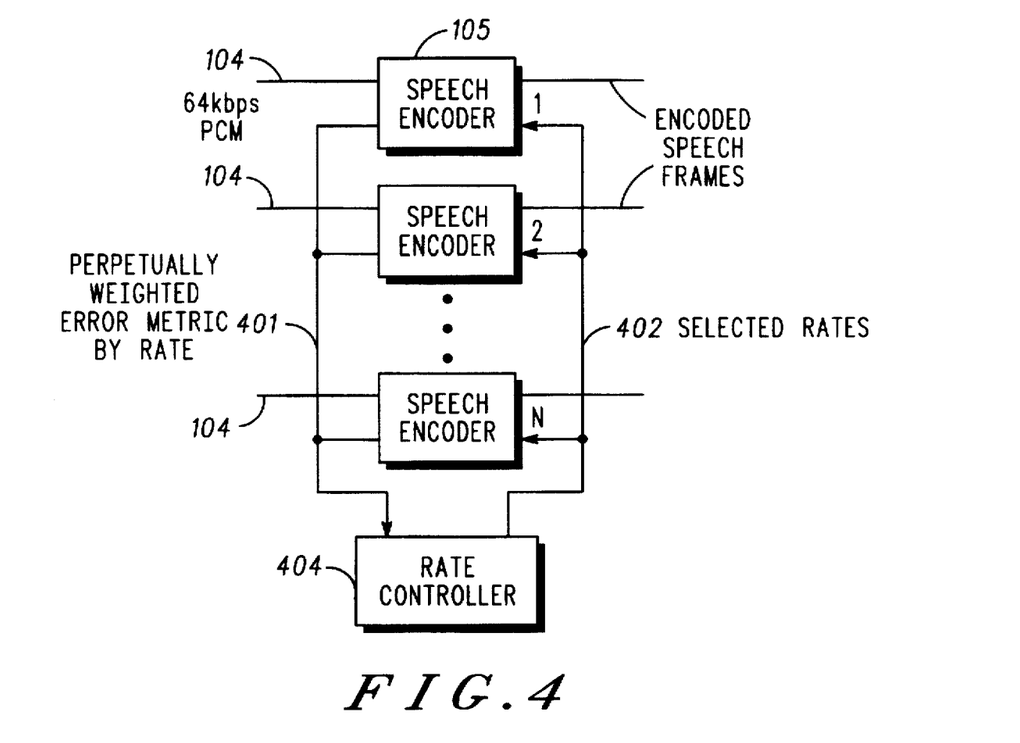
FIG. 4 generally depicts, in block diagram form, the use of a supervising processor or rate controller to group speech encode in accordance with the invention.

The method shown in FIG. 4 can be used to overcome these deficiencies. In FIG. 4, each speech encoder (105) evaluates, for each 20 ms frame, the perceptually weighted error metric (401) produced by encoding the speech frame at each of the four candidate rates (more than four rates may be possible in alternate embodiments). This information is then passed back to a supervising rate controller (404). Rate controller (404) then forms a rate/quality table similar to that of FIG. 5, which depicts the perceptually-weighted error produced by encoding at each of the candidate rates for each of the N speech encoders reporting to the rate controller.

Figure 5:
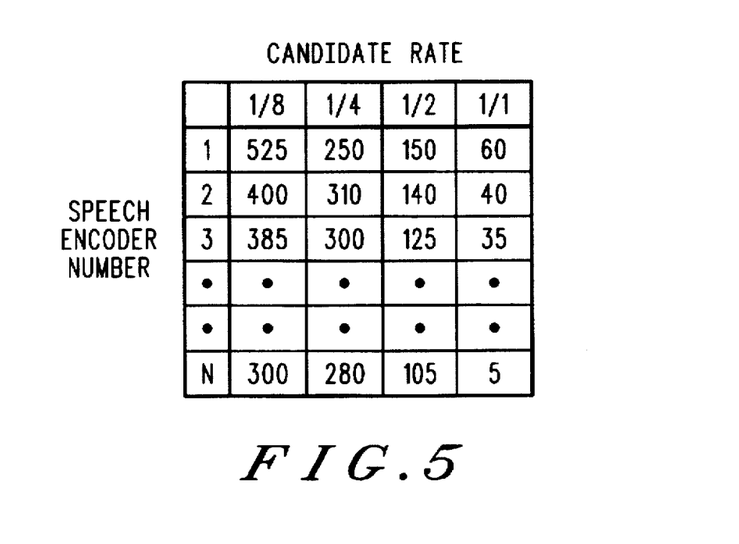
FIG. 5 generally depicts a rate/quality table utilized by the rate controller as part of a number of algorithms for optimizing the overall speech quality of a sector/cell subject to a constraint on transmitted power from the sector/cell in accordance with the invention.

A simple approach to optimizing the overall voice quality of the cell or sector starts by assuming that all N voice channels have equal transmit power. All of the encoders (105) are placed in the lowest candidate rate and the total transmit power P is calculated by rate controller (404). In this case, P is simply equal to the sum of the rate values for all N encoders, where the rate value for ⅛ rate is ⅛, for ¼ rate is ¼, and so on. Rate controller (404) then finds the largest entry in the rate/quality table corresponding to the current candidate rate for any of the N encoders. This is equivalent to identifying the encoder with the worst voice quality (i.e. the largest perceptually weighted error) for the current set of selected rates. The rate for that encoder is increased to the next highest rate, and P is recalculated. This process continues until P exceeds some total power threshold T at which time the procedure terminates. An improved approach would be to apply the procedure to rate/quality table entries which have been weighted by the transmit gain associated with each encoder. This would be extracted from power level block (110). It will be appreciated by one of ordinary skill in the art that the overall effect of this procedure is to reduce power by sacrificing the rate of those encoders which will suffer the least reduction in quality by operating at a lower rate.

A more complex approach would be as follows. Assume that, as above, the goal (i.e., the predetermined criterion) of the rate-reduction scheme during periods of high traffic loading is to maintain the overall transmitted power to be less than some threshold T, where T is set according to the current load conditions. Define a global measure Q of speech quality for the sector/cell served by the base-station to be the sum of the perceptual errors for the current set of selected rates for the N voice channels. Each encoder is initialized to encode at the maximum rate. Q is then evaluated and the corresponding transmitted power calculated using either the equal power assumption or the weighted transmit power method described above.

Figure 6:
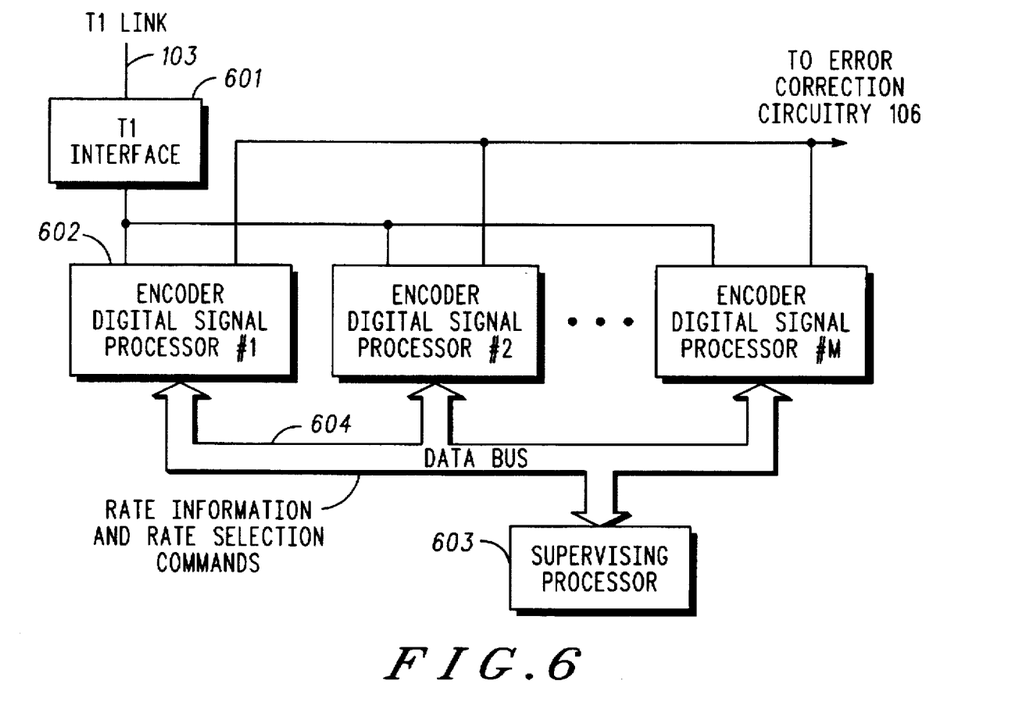
FIG. 6 generally depicts, in block diagram form, an apparatus for implementing the CDMA group encoding method in accordance with the invention.

A simplification of this method would occur where the rate controller (404) was not available, but where each DSP was encoding several voice links by time-sharing its available computational resources. In that case, the rate selection procedure would be applied over the number of voice channels for which the DSP was performing encoding. FIG.

6 generally depicts an apparatus which may be used to implement this scenario. In FIG. 6, a single DSP (603), such as the Motorola DSP56156, communicates via a time-division multiplexed serial bus or a conventional parallel address/data bus. Rate determination information and rate selections are passed between the controlling DSP (603) and the DSP's (602) used for speech encoding via bus (604). Alternatively, the controlling DSP (603) may be eliminated and one of the encoder DSP's (602) promoted to fulfill the global rate controller function and speech encoding for one or more voice channels.

Figure 7:
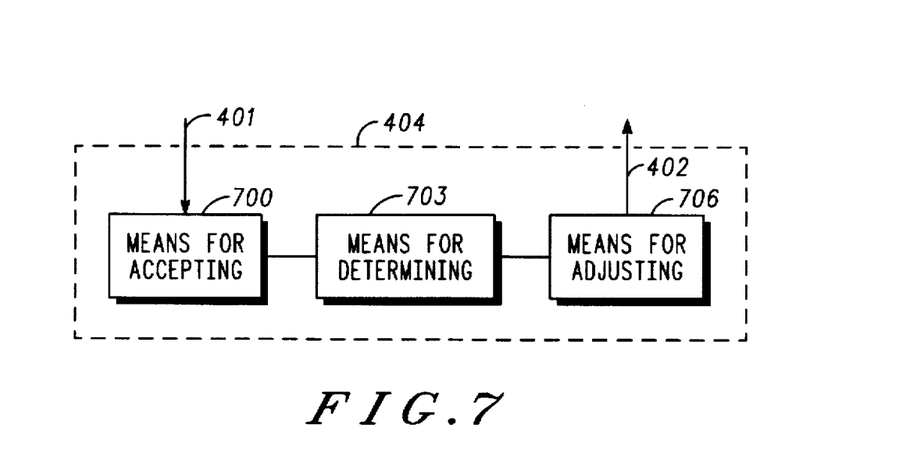
FIG. 7 generally depicts, in block diagram form, a rate controller which may beneficially implement group encoding in accordance with the invention.

FIG. 7 generally depicts, in block diagram form, a rate controller (404) which may beneficially implement group encoding in accordance with the invention. Rate controller (404) comprises means for accepting (700) rate determination information (401) from a plurality of encoders (105). In the preferred embodiment, rate determination information is quality information which includes a perceptually weighted error metric. Means for accepting (700) has its output entering means for determining (703) which determines encoding requirements based on predetermined criterion. The predetermined criterion include those stated above as threshold criterion. The output of means for determining (703) is input into means for adjusting (706) which adjusts the encoding rate for any encoder out of the plurality of encoders based on the rate determination information and the predetermined criterion. In a scenario where the predetermined criterion is total transmit power or available memory space, means for adjusting (706) will typically increase the encoding rate for the encoder having the worst quality (based on a determination/calculation of either total transmit power or available memory space and a threshold) as described above. However, certain predetermined criterion, such as system capacity, may require means for adjusting (706) to decrease the encoding rate for a particular encoder.

While the invention has been particularly shown and described with reference to a particular embodiment, it will be understood by those skilled in the art that various changes in form and details may be made therein without departing from the spirit and scope of the invention.

What we claim is:

1. A method of encoding signals in a wireless communication system, the method comprising the steps of:
   accepting quality information from at least two encoders;
   determining encoding requirements of at least one encoder based on the quality information from the at least two encoders;
   adjusting the encoding rate of at least one encoder based on the determined encoding requirements; and
   outputting the encoded signal from the at least one encoder, wherein the encoded signal is encoded using the adjusted encoding rate of at least one encoder.

2. The method of claim 1 wherein the at least two encoders further comprise analysis-by-synthesis encoders.

3. The method of claim 1 wherein the quality information further comprises perceptual weighting error metrics generated by the analysis-by-synthesis speech encoders, signal-to-noise (S/N) ratio, segmented S/N, cepstral distance, a linear predictive coding (LPC) distance measurement and a spectral distance measurement.

4. The method of claim 1, wherein the step of determining encoding requirements of at least one encoder based on the quality information from the at least two encoders further comprises the step of determining the encoding requirements of the at least first encoder based on the quality information from the at least two encoders and a threshold criterion.

5. The method of claim 4 wherein the threshold criterion further comprises either the total output power of the sector/cell to which the encoders are assigned, the total output power of an adjacent sector/cell, the current power level of transmission by a serving base-station, the current data rate of the at least two encoders, the memory available in a memory means, the processing power available in a processing means or the bandwidth available in a predetermined spectrum.

6. The method of claim 1 wherein the at least two encoders further comprise at least two variable rate encoders.

7. The method of claim 1 wherein the signals further comprise either speech signals, video signals or data signals.

8. A method of encoding signals in a wireless communication system, the method comprising the steps of:
   accepting quality information from a plurality of encoders;
   calculating a total transmit power for a transmitter;
   comparing the total transmit power for the transmitter with a threshold;
   increasing the encoding rate for a selected encoder based on the quality information when the calculated total transmit power for the transmitter is below the threshold; and
   outputting the encoded signal from the selected encoder, wherein the encoded signal is encoded using the increased encoding rate of the selected encoder.

9. The method of claim 8 further comprising the step of repeating the steps of accepting, calculating, comparing and increasing until the calculated total transmit power for the transmitter is at or above the threshold.

10. The method of claim 8, wherein the step of increasing the encoding rate for a selected encoder based on the quality information further comprises increasing the encoding rate for the encoder producing the worst quality based on the quality information.

11. A method of encoding signals comprising the steps of:
   accepting quality information from a plurality of encoders;
   determining available memory space in a memory means;
   increasing the encoding rate for a selected encoder based on the quality information and the determined available memory space in the memory means; and
   outputting the encoded signal from the selected encoder, wherein the encoded signal is encoded using the increased encoding rate of the selected encoder.

12. The method of claim 11, wherein the step of increasing the encoding rate for a selected encoder based on the quality information further comprises increasing the encoding rate for the encoder producing the worst quality based on the quality information.

13. A method of encoding signals comprising the steps of:
   accepting quality information from a plurality of encoders;
   determining encoding requirements based on predetermined criterion;
   adjusting the encoding rate for any encoder out of the plurality of encoders based on the quality information and the predetermined criterion; and
   outputting the encoded signal from any encoder out of the plurality of encoders, wherein the encoded signal is encoded using the adjusted encoding rate of any of the encoders.

14. The method of claim 13 wherein the predetermined criterion further comprises either the total output power of the sector/cell to which the encoders are assigned, the total output power of an adjacent sector/cell, the current power level of transmission by a serving base-station, the current data rate of the at least two encoders, the memory available in a memory means, the processing power available in a processing means or the bandwidth available in a predetermined spectrum.

15. An apparatus for encoding signals, the apparatus comprising:

means for accepting quality information from at least two encoders;

means, coupled to the means for accepting, for determining encoding requirements of at least one encoder based on the quality information from the at least two encoders;

means, coupled to the means for determining, for adjusting the encoding rate of at least one encoder based on the determined encoding requirements; and means for outputting the encoded signal from at least one encoder, wherein the encoded signal is encoded using the adjusted encoding rate of at the least one encoder.

16. The apparatus of claim 15 wherein the at least two encoders further comprise analysis-by-synthesis encoders.

17. The apparatus of claim 15 wherein the quality information further comprises perceptual weighting error metrics generated by the analysis-by-synthesis speech encoders, signal-to-noise (S/N) ratio, segmented S/N, cepstral distance, a linear predictive coding (LPC) distance measurement and a spectral distance measurement.

18. The apparatus of claim 15, wherein the means for determining encoding requirements of at least one encoder based on the quality information from the at least two encoders further comprises means for determining encoding requirements of at least one encoder based on the quality information from the at least two encoders and a threshold criterion.

19. The apparatus of claim 18 wherein the threshold criterion further comprises either the total output power of the sector/cell to which the encoders are assigned, the total output power of an adjacent sector/cell, the current power level of transmission by a serving base-station, the current data rate of the at least two encoders, the memory available in a memory means, the processing power available in a processing means or the bandwidth available in a predetermined spectrum.

20. The apparatus of claim 15 wherein the at least two encoders further comprise at least two variable rate encoders.

21. The apparatus of claim 15 wherein the signals further comprise either speech signals, video signals or data signals.

22. An apparatus for encoding signals in a communication system, the apparatus comprising:

means for accepting quality information from a plurality of encoders;

means, coupled to the means for accepting, for calculating a total transmit power for a transmitter and comparing the total transmit power for the transmitter with a threshold;

means, coupled to the means for calculating, for increasing the encoding rate for a selected encoder based on the quality information from the plurality of encoders when the calculated total transmit power for the transmitter is below a threshold; and means for outputting the encoded signal from the selected encoder, wherein the encoded signal is encoded using the increased encoding rate of the selected encoder.

23. The apparatus of claim 22, wherein the means for increasing the encoding rate for a selected encoder based on the quality information further comprises means for increasing the encoding rate for the encoder producing the worst quality based on the quality information.

24. An apparatus for encoding signals comprising:

means for accepting quality information from a plurality of encoders;

means, coupled to the means for accepting, for determining available memory space;

means, coupled to the means for determining, for increasing the encoding rate for a selected encoder based on the quality information from the plurality of encoders and the determined available memory space in the memory means; and means for outputting the encoded signal from the selected encoder, wherein the encoded signal is encoded using the increased encoding rate of the selected encoder.

25. The apparatus of claim 24, wherein the means for increasing the encoding rate for a selected encoder based on the quality information further comprises means for increasing the encoding rate for the encoder producing the worst quality based on the quality information.

26. An apparatus for encoding signals comprising:

means for accepting quality information from a plurality of encoders;

means, coupled to the means for accepting, for determining encoding requirement based on predetermined criterion;

means, coupled to the means for determining, for adjusting the encoding rate for any encoder out of the plurality of encoders based on the quality information from the plurality of encoders and the predetermined criterion; and means for outputting the encoded signal from any encoder out of the plurality of encoders, wherein the encoded signal is encoded using the adjusted encoding rate of any of the encoders.

27. The apparatus of claim 26 wherein the means for determining encoding requirements based on predetermined criterion further comprises means for determining encoding requirements based on either the total output power of the sector/cell to which the encoders are assigned, the total output power of an adjacent sector/cell, the current power level of transmission by a serving base-station, the current data rate of the at least two encoders, the memory available in a memory means, the processing power available in a processing means or the bandwidth available in a predetermined spectrum.

* * * * *